United States Patent [19]
Weber et al.

[11] Patent Number: 5,644,754
[45] Date of Patent: Jul. 1, 1997

[54] BUS CONTROLLER AND ELECTRONIC DEVICE IN A SYSTEM IN WHICH SEVERAL ELECTRONIC DEVICES ARE NETWORKED

[75] Inventors: Karl Weber, Altdorf; Klaus Spichtinger, Stulln; Karl-Theo Kremer, Adelsdorf, all of Germany

[73] Assignee: Siemens Aktiengesellschaft, München, Germany

[21] Appl. No.: 340,693

[22] Filed: Nov. 16, 1994

[30] Foreign Application Priority Data

Nov. 22, 1993 [EP] European Pat. Off. .............. 93118775

[51] Int. Cl.$^6$ .................................................. G06F 13/14
[52] U.S. Cl. .................... 395/500; 395/292; 395/200.06; 364/DIG. 1; 364/242.2
[58] Field of Search ............................. 395/500, 275, 395/600, 401, 200.08, 280, 292, 200.06; 364/200 MS File

[56] References Cited

U.S. PATENT DOCUMENTS

| | | | |
|---|---|---|---|
| 4,716,524 | 12/1987 | Oxley et al. ............... | 364/200 |
| 4,896,261 | 1/1990 | Nolan ...................... | 364/200 |
| 5,165,021 | 11/1992 | Wu et al. .................. | 395/250 |
| 5,220,653 | 6/1993 | Miro ........................ | 395/275 |
| 5,403,639 | 4/1995 | Belsan et al. ............. | 395/600 |
| 5,446,855 | 8/1995 | Dang et al. ............... | 395/401 |
| 5,465,331 | 11/1995 | Yang et al. ................ | 395/200.08 |

FOREIGN PATENT DOCUMENTS 0 466 229  1/1992  European Pat. Off. .

OTHER PUBLICATIONS

"Distributed Directory Scheme: Stanford Distributed–Directory Protocol", by M. Thapar and B. Delagi, IEEE, Computer Magazine, Jun. 1990, pp. 78–80.

"A Cache Coherency Scheme for an Asynchronous Packet–Switched Shared Memory Multiprocessor", by S. Alles and S. Mahmud, Circuits and Systems, 1993 IEEE Midwest Symposium, pp. 173–176.

"On the Doubly–Linked List Protocol for Distributed Shared Memory Multiprocessor Systems", A. Lau et al., IEEE, Algorithms and Architecture, 1995 Int'l. Conference (1st), Feb. 1995, pp. 293–302.

Primary Examiner—Kevin J. Teska
Assistant Examiner—Russell W. Frejd
Attorney, Agent, or Firm—Kenyon & Kenyon

[57] ABSTRACT

A bus controller for an electronic device which has an intelligence (or processor) of its own and a memory having a plurality of individually addressable memory locations which are connected with each other via a system bus. The bus controller can be connected with at least the memory and a network bus. The network bus serves for networking several electronic devices with each other (including the electronic device). The bus controller manages at least one request-receipt queue with queue elements for requests to be received over the network bus, wherein the queue is organized as a double-linked list.

39 Claims, 4 Drawing Sheets

| Start | Length | DA | SA | FC | DSAP | SSAP | data | check | Stop |

BUS CONTROLLER AND ELECTRONIC DEVICE IN A SYSTEM IN WHICH SEVERAL ELECTRONIC DEVICES ARE NETWORKED

BACKGROUND OF THE INVENTION

The present invention relates to a bus controller for an electronic device which has an intelligence (or processor) of its own and a memory having a large management block of individually addressable memory locations which are connected to each other by a system bus, the bus controller being adapted to be connected at least to the memory and a network bus, the network bus networking several electronic devices with each other.

Such bus controllers are widely used. They are employed, for instance, in field buses such as the PROFIBUS. The PROFIBUS protocol describes, for instance, how individual requests to send and receive are to be handled towards the outside, i.e. on the network bus. However, it does not provide any suggestion as to how requests to send and receive can be effectively managed within the system.

U.S. Pat. No. 4,896,261 discloses an electronic device which has a bus driver which manages a send queue. The send queue is organized as a double-linked list. Only the list data as well as the pointers to the data blocks are stored in the pointer blocks. A similar disclosure is provided by U.S. Pat. No. 5,165,021.

SUMMARY OF THE INVENTION

The present invention provides an electronic device and a bus controller for the effective internal management of commands.

One embodiment of the present invention relates to a bus controller for an electronic device which includes a processor and a memory having individually addressable memory locations. A system bus which connects the processor and memory is connectable with a network bus which networks the electronic deice with one or more other electronic devices. The bus controller manages at least one request-receipt queue having queue elements for requests to be received via the network bus, wherein the queue is organized as a double-linked list.

In another further embodiment of the present invention, at least one internal application can be executed by the electronic device. The internal application communicates via the network bus with an external application which can be executed by another electronic device connected to the network bus. The bus controller provides at least one communication service access point with at least one queue for requests to be received.

In another further embodiment of the present invention, the processor (or intelligence) of the electronic device manages requests and responses in accordance with a higher-order protocol. The bus controller manages at least one request-send queue for requests to be sent and at least one request queue for requests to be received, and an execution queue for requests sent and/or received, wherein each of the queues includes a queue head and management blocks as queue entries. Management-block-specific queue management data, user-specific memory management data, and management data of the higher-order protocol are stored in the management blocks.

According to the present invention, the bus controller manages at least one request-receipt queue with queue elements for requests to be received over the network bus, the queue being organized as a double-linked list. In this manner, it is particularly easy to link and unlink any desired queue elements in the queue.

The management of at least one request-receipt queue without a request-send queue is sufficient if the electronic device merely receives and responds to requests but does not itself send its own requests. If the electronic device, on the other hand, can itself be active as a sender, the bus controller also can manage at least one request-send queue with queue elements for requests to be sent, which is also organized as a double-linked list.

The bus controller preferably also manages at least one execution queue for requests received or sent, which queue is also organized as a double-linked list. In this case, after the receiving or sending of a request, the first element of the corresponding request queue is unlinked from this queue and linked as a last element in the execution queue. The bus controller manages separate execution queues for sent and received requests in a particularly advantageous manner.

The electronic device with which the bus controller is connected customarily handles several applications. These applications are referred to below as internal applications. Other electronic devices also process applications, these being referred to below, in order to distinguish them, as external applications. For communication between internal applications and external applications, the bus controller provides at least one communication service access point which comprises at least one queue for requests to be received.

The bus controller preferably also makes available a communication service access point of its own for each communication relation between an internal application and an external application. In this way, communication between the different internal applications can be uncoupled from one another.

The communication can be handled particularly effectively if the bus controller for each service access point manages in each case one receipt queue for requests to be received and one response queue separate therefrom for responses to received requests to be sent. In principle, however, the management of only one queue for requests to be received and responses to be sent is also possible.

The communication between the processor (or intelligence) and the bus controller takes place as a general rule in accordance with a predetermined interface definition, for instance in layer 4 of the ISO-7-layer model. The memory management is particularly efficient in such a case if each queue consists of a queue head and management blocks as queue entries, management data which are specific to the management blocks (address pointers to the preceding and following queue elements), memory management data which are specific to user data (addresses of at least one user-data block and corresponding data-block length), as well as management data which are specific to the interface being stored in the management block. In the case of the PROFIBUS, these interface-specific management data are, for instance, the so-called layer-4-data. In this way, in particular due to the interface-specific management data, it is possible to send even large amounts of user data piecewise without machine-internal copying into individual user-data blocks via the network bus.

If the bus controller sends requests over the network bus in accordance with a predetermined bus protocol, request-specific protocol frame data are preferably also stored in the management blocks. With respect to requests to be received, comparison data by means of which the protocol frame data of a received request can be checked are stored in the queue head of the request-receipt queue. In this way, it is possible to store in the request-receipt queue only those received requests the protocol frame data of which agree with the comparison data, and therefore have been sent by the external application determined by the comparison data.

BRIEF DESCRIPTION OF THE DRAWINGS

Further advantages and details will become evident from the following description of an embodiment of the present invention, read with reference to the drawings.

DETAILED DESCRIPTION

Figure 1:
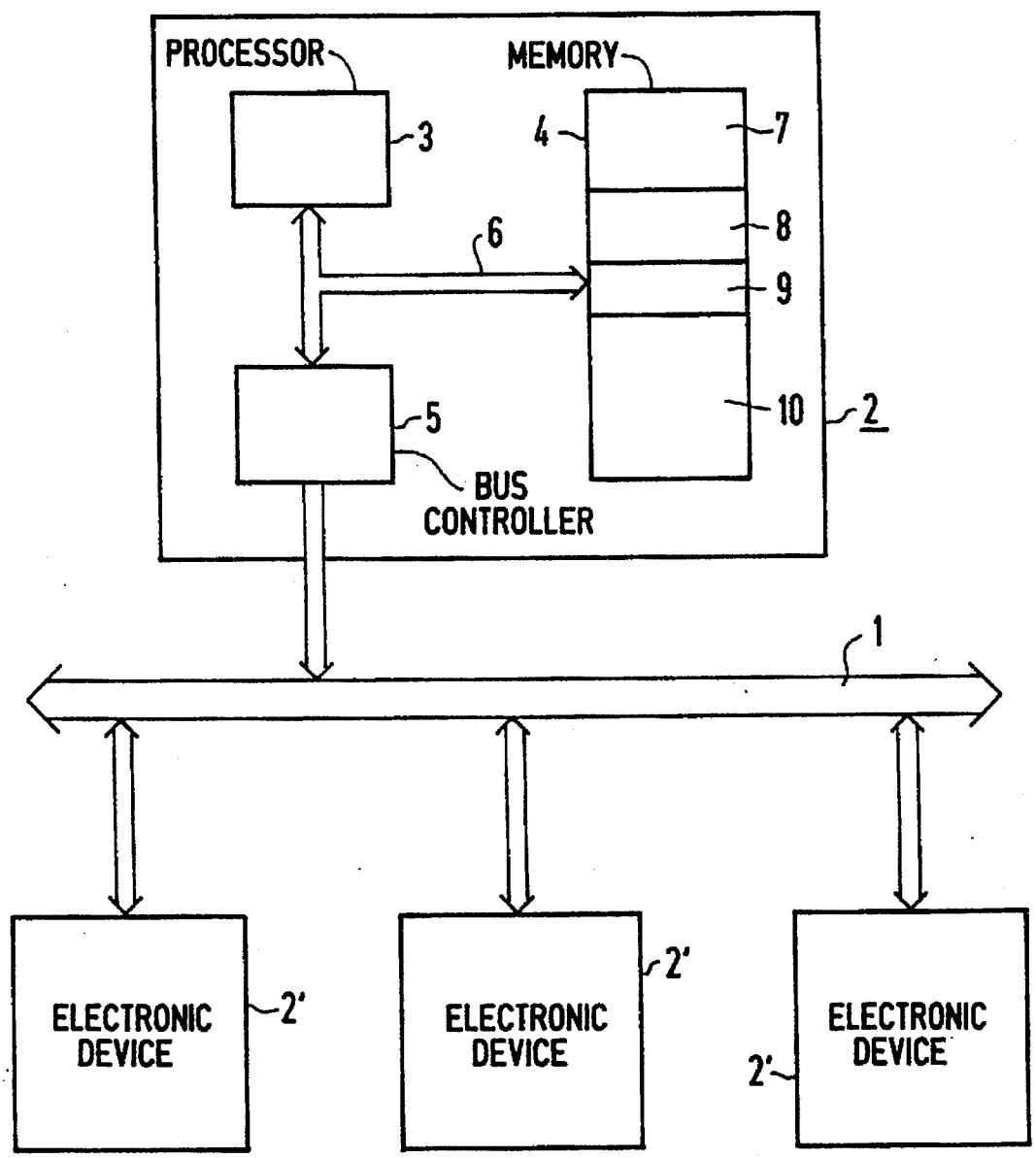
FIG. 1 illustrates a network bus having a plurality of electronic devices connected to it according to an embodiment of the present invention.

Referring to FIG. 1, several electronic devices 2, 2', are connected to a network bus 1. The electronic devices 2, 2' are, for instance, programmable controls or intelligent field clamps. The electronic device 2 includes a processor 3 (or intelligence), a memory 4, and a bus controller 5, connected to each other by a system bus 6. The memory 4 contains a large number of individually addressable memory locations or memory cells.

The other electronic devices 2' are, in principle, constructed in exactly the same manner as the electronic device 2. Therefore, a detailed description of the electronic devices 2' has been dispensed with, for the sake of better clarity of the drawing.

The network bus 1 is, for instance, a serial bus which is operated in accordance with the standardised PROFIBUS protocol. The network bus 1 could, however, also be operated in some other manner or be a parallel bus, for example.

The memory 4 has several memory regions 7 to 10. The program executed by the processor 3 is stored in memory region 7. The corresponding data are placed in memory region 8. The memory region 9 forms the so-called system control block which will be discussed in further detail below. Management blocks (or application blocks) are stored in storage region 10. These management blocks (or application blocks) will also be further discussed below in connection with the system control block 9.

The following describes how the bus controller 5 has access to the memory 4 and how the bus controller 5 finds requests to be sent in the memory 4, how the bus controller 5 places received requests in the memory 4, as well as other things. The following does not describe how the processor 3 has access to the memory 4. However, it is easily apparent that the processor 3, insofar as the data exchange with the bus controller 5 is concerned, must effect corresponding accesses to the memory.

Figure 2:
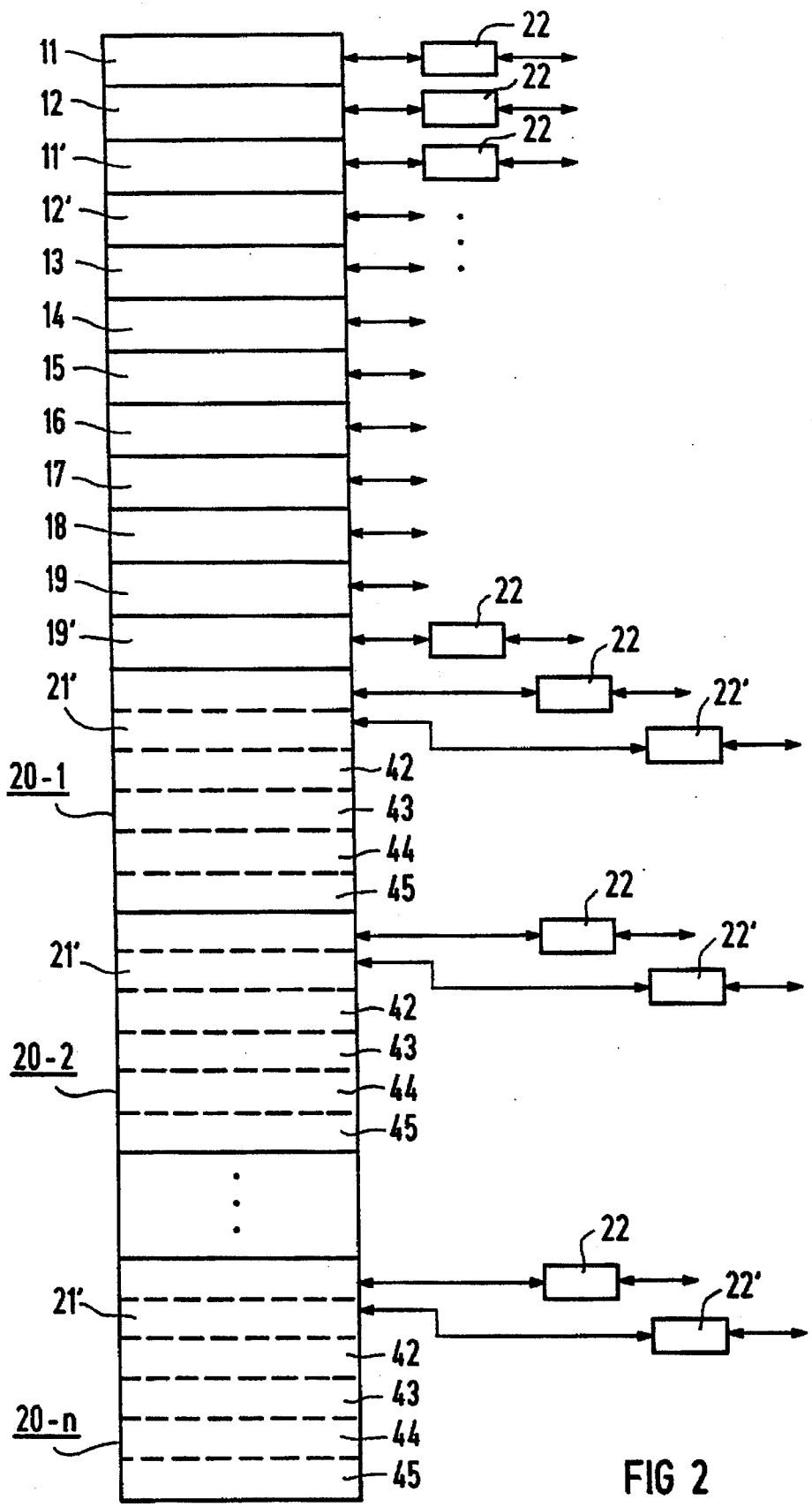
FIG. 2 illustrates, in detail, the principle of the memory management of one of the electronic device of FIG. 1.

For the effective management of the data, the processor 3 sets up the system control block 9 shown in FIG. 2 upon the placing in operation of the electronic device 2. For this purpose, the processor 3 stores two addresses in each partial segment 11 to 20-n. These two addresses point in each case to the first and last elements of a queue of management blocks. Depending on the configuration and parameterization of the electronic device 2, the system control block 9, however, could also be set up by the bus controller 5.

The base address from which the system control block 9 is set up is communicated to the bus controller 5 by the processor 3. As an alternative to this arrangement, it is possible for the bus controller 5 to ask the processor 3 for the base address. In both cases, however, all data of the system control block 9 can easily be found, since it is known at what relative address offset from the base address a data item is stored.

Requests and responses to requests are sent over the network bus 1. Both requests and responses must be sent and received. The system control block 9 therefore consists of the following partial segments:

A partial segment 11 for a request-send queue for high-priority requests to be sent. This queue is always served by the bus controller 5.

A partial segment 12 for low-priority requests to be sent. This queue is served by the bus controller 5 when it is in operating mode (operating message) and when the high-priority queue 11 is empty.

Partial segments 11', 12' for request-send queues for high-priority and low-priority background requests, respectively. These queues are served by the bus controller 5 when it is in background mode (background message) and when the queue 11 is empty. A determination of which of the two modes the bus controller 5 is in may be made in this connection by the processor 3, which switches the bus controller 5 as necessary.

One partial segment 13, 14 each for an execution queue for high-priority and low-priority received requests, respectively.

One segment 15, 16 each for an execution queue for high-priority and low-priority sent requests, respectively.

One segment 17, 18 each for an execution queue for high-priority and low-priority requests, respectively, which cannot be properly executed.

One partial segment 19 for a monitor queue for monitoring the network bus 1.

One partial segment 19' for an identification queue for the storing of a network-bus-related bus controller identification message.

A number of segments 20-1 to 20-n for, in each case, one request-receipt queue. The receipt queues correspond, on a basis of their arrangement, to a service access address by means of which they are distinguishable from each other.

All queues are managed by the bus controller 5. The construction of the queues will now be explained on the basis of FIG. 3. For the explanations of FIG. 3 it is irrelevant which of the queues is concerned.

Figure 3:
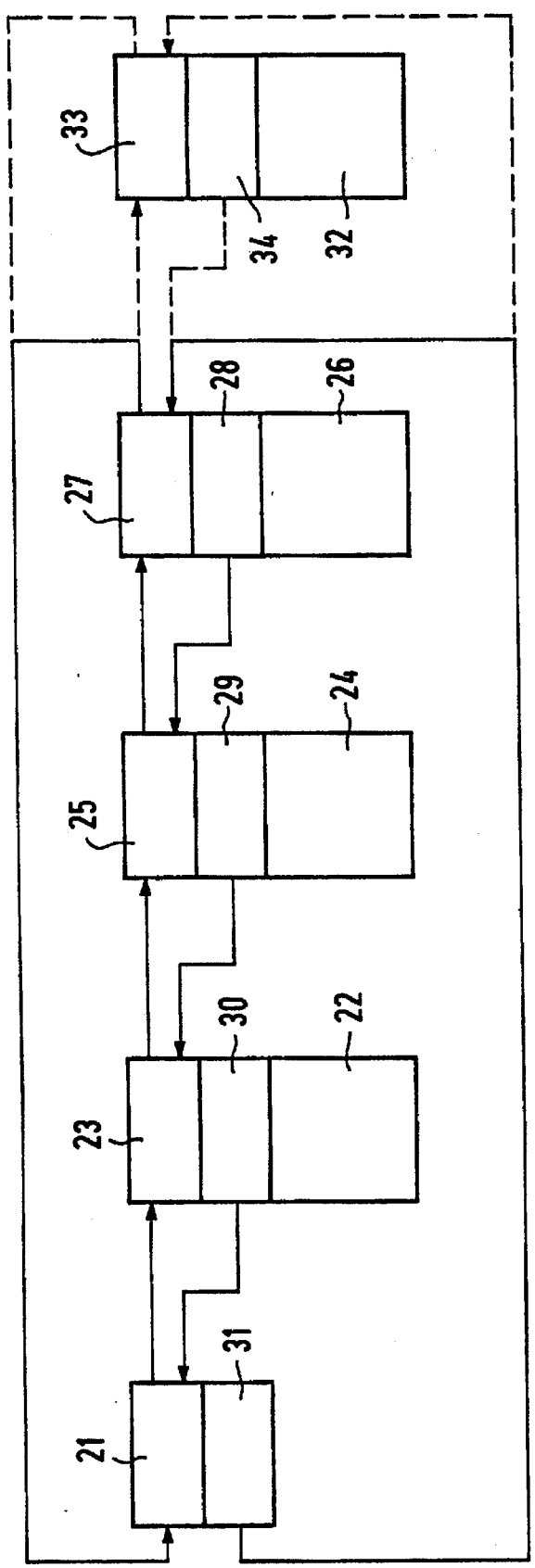
FIG. 3 illustrates the construction of a queue.

In accordance with FIG. 3, an address which points to the first management block 22 of the queue in question is stored in the first memory location 21 of the partial segment associated with the corresponding queue (also known as the queue head). An address is stored in the first memory location 23 of this management block 22 which points to the second management block 24 of the corresponding queue. The address in the first memory location 25 of management block 24 points to the third management block and, in the illustrated case, the last management block 26 of the corresponding queue. The starting address of the corresponding queue which points back to the corresponding partial segment of the system control block 9 is stored in the first memory location 27 of management block 26. By this manner of pointing, a simple forward-linked list is created.

In order to also obtain a rearward-linked list, and therefore, as a result, a double-linked list, the address of the preceding management block is stored in each case in the memory locations 28 to 31. Therefore, the address of the management block 24 is stored in the memory location 28, the address of the management block 22 is stored in the memory location 29, and the starting address of the corresponding segment is stored in the memory location 30. The address of the last management block 26 is furthermore stored in the memory location 31.

In order to unlink or remove the first management block 22 from such a list, the following procedure is implemented.

First, the address for the management block 22 is read from the memory location 21. The address of the management block 24 is then read out of the memory location 23 and stored in memory location 21. With respect to the forward linking, the management block 22 is thus already unlinked from the list. In order to unlink the management block 22 also from the rearward-linked list, the address of the corresponding partial segment, i.e. the address which was previously stored in memory location 30, is entered in memory location 29.

The management block 21 is thus removed from the queue. In order to add an additional management block 32 to the queue, the following procedure is implemented.

First of all, it may be mentioned that the address of this management block 32 must, of course, be known. The address may be known, for instance, from the fact that the management block was unlinked immediately before from another queue or that the management block 32 was just generated by the processor 3.

In order to link the management block 32 into the forward-linked list, the address stored in memory location 31 is read and the address of management block 32 is entered in memory location 27. Furthermore, the address of the partial segment which was previously stored in memory location 27 is stored in memory location 33. In a similar manner, for including the management block 32 in the rearward-linked list, the address of the management block 26 is stored in memory location 34 and the address of the management block 32 is stored in memory location 31. In this way, the management block 32 is added to the queue as a last element.

With the exception of the monitor queue, which will be discussed in further detail below, all lists and queues are of the same construction and therefore linked in the same manner. Accordingly, the linking and unlinking of management blocks from queues always takes place in the same manner. It is therefore independent of the queue from which the management block is unlinked or into which it is linked.

Furthermore, as a result of the double linking, it is easily possible to remove any block from a queue or introduce it into a queue. With a singly linked list, this would be possible only by a single search through the entire chain. With double linking, it is therefore easily possible to erase or newly insert individual requests which are defined on the basis of management blocks.

The construction of the management blocks 22, 24, 26 will now be described, by way of example, for the management block 22 on the basis of FIG. 4.

Figures 4, 5:
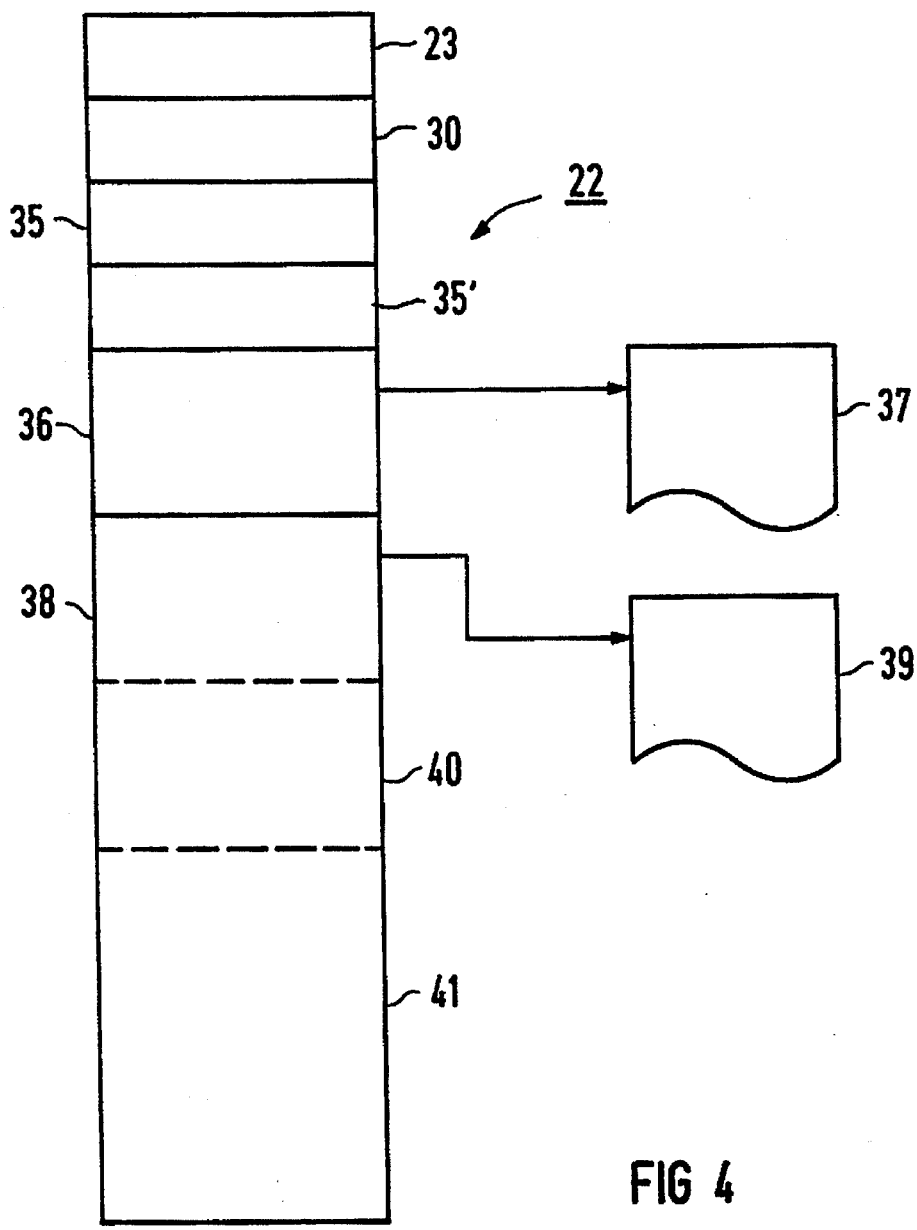
FIG. 4 illustrates the construction of a management block.
FIG. 5 illustrates the construction of a message.

In accordance with FIG. 4, the management block 22 consists of the following elements in addition to the memory locations 23 and 30 already mentioned:

A memory block 35 in which a so-called operation code is stored. The operation code allows a determination, for instance, of whether the management block 22 is being managed at the time by the processor 3 or by the bus controller 5 and whether the management block 22 is linked in a request-send queue, in a request-receipt queue, on in a response-send queue.

A management block 35' in which organizational data which are unimportant for the management of requests by the bus controller 5 are stored (on the other hand, these data are of importance for the corresponding request management by the processor 3). The organizational data comprise, for instance, an identification code by means of which the processor 3 can associate the management block with a given internal application.

A memory block 36, the so-called response header in which the initial address of a response data block 37, the length of this data block 37, and the status of the data block 37 are stored.

A memory block 38, the so-called request header, in which the initial address of a request data block 39 and its length are stored. Furthermore, the request header 38 also has two partial blocks 40, 41. Request-specific protocol frame data are stored in the partial block 40. These data are the internal network-bus-specific address of another electronic device 2, as well as the number of the internal service access point. Furthermore, the network bus-specific address of another electronic device 2' and a service access point address of the other electronic device 2' are stored in the partial block 40. By these four data, it is determined between what service access points of what electronic devices 2, 2' the communication takes place. Furthermore, the type of function to which the request belongs is also stored in the partial block 40. Finally, management data of a higher-order protocol (in the present case, the layer-4 data of the ISO-7-layer model) are stored in the partial block 41.

In the following, it will be described what steps the bus controller 5 carries out when it wishes to send a request. The request is sent in this connection in accordance with a given bus protocol. The explanation of this protocol will be given later in connection with FIG. 5, insofar as it is necessary for an understanding of the present invention. For greater clarity of the drawing, it is therefore assumed in the following that one of the request-send queues is shown in FIG. 3. The memory locations 21 and 31 therefore, with this assumption, correspond to one of the partial segments 11, 11', 12 or 12'.

For the sending of the request, the bus controller 5 reads the address of the first management block 22 from the memory location 21. The bus controller 5 then reads the partial block 40 completely and also the initial address of the request-data block 39 from the memory block 38. Furthermore, the bus controller 5 reads the length of the request-data block 39. The data length corresponds to the actual data length upon the sending of requests. The bus controller reads, from the data block 39, the data stored there and sends them, together with the protocol frame data, the management data of the higher-order protocol which are stored in the partial block 41 and the data length over the network bus 1. The management data of the higher-order protocol are in this connection sent over the network bus 1 after the protocol frame data but before the actual user data.

In the case of certain requests, the bus controller 5 does not expect a response, and in the case of many other requests it expects only an acknowledgement of receipt. In these cases, immediately after the sending of the request or the receipt of the acknowledgement from the receiving device, the bus controller 5 commences the unlinking of the management block 22 from the queue. However, it the request must be answered, the bus controller 5 proceeds as follows:

The bus controller 5 reads the address which points to the response data block 37 from the memory block 36. It also reads the maximum response length from the memory block 36. The response received is stored by the bus controller 5 in the data block 37. Furthermore, the bus controller 5 notes, on the basis of the protocol received, the actual length of the response and stores it in the memory block 36. After the storing of the response, the management block 22 is unlinked from the request-send queue and entered as a last element into the corresponding execution queue for sent requests and/or into the corresponding execution queue for requests not duly executed, depending on whether the sent request could be properly executed or not.

A request, of course, must not only be sent by a device 2. It must also be received by another device 2' and possibly answered. In order to assure proper data exchange over the network bus 1, messages therefore have the structure shown in FIG. 5. In accordance with FIG. 5, a message sent over the network bus 1 consists of the following elements:

A starting block "start", for instance a start byte having a given bit pattern, as well as a length block "length" which reflects the data length of the message. Depending on the start block, the length can also be determined already by the starting block "start" itself. In this case, the length block "length" is dispensed with.

A destination controller address DA (destination address) by means of which the bus controller for which the message is determined is established.

A send controller address SA (source address) by means of which the receiving device can note from which bus controller the message was sent.

A function block FC (function) which indicates the type of function of the data sent.

A destination service access point DSAP by means of which it is determined with what application of the receiving device communication is to be effected.

A source service access point (SSAP) by means of which the receiving bus controller can note from which application of the sending device a message is coming.

The actual "data".

A check block "check" with a checksum, for instance a CRC (cyclically redundancy check).

A stop block "stop", for example a stop byte having a given bit pattern.

Similar to the description of a send request, it will be assumed in the following, for greater clarity, that one of the receipt queues is shown in FIG. 3. The memory locations 21 and 31 therefore, with this assumption, correspond to one of the partial segments 20-1 to 20-n.

Upon the detection of the start block "start", all electronic devices 2, 2' connected to the network bus 1, with the exception of the sending device, pass to reception. If they have received the destination controller address DA, they compare this address DA with their own controller address. All bus controllers 5 having an address different from the received destination controller address thereupon terminate further reception of the message. Only the electronic device 2 whose own address is equal to the destination controller address DA receives the entire message.

After the receipt of the destination service access address DSAP, source controller address SA and source service access address SSAP, function block FC, as well as the data length "length", the bus controller 5 first of all carries out the following steps:

From the partial segment which is associated with the request-receipt queue defined by the destination service access point, and in the present case therefore, for instance, from the partial segment 20-1, from memory locations 42 to 45 the maximum permissible data length, the expected function code, the expected controller address, and the expected service access address. The bus controller then compares these values with the received function code FC, the received message length, the received source controller address SA, and the received source service access point SSAP. If the function codes or the addresses do not agree, or if the actual data length is greater than the maximum data length, the bus controller 5 suppresses the storing of the data and sends out a negative acknowledgement.

Otherwise, the bus controller 5 reads the address of the first management block 22 from the memory location 21. The bus controller 5 then stores the management data of the higher-order protocol in the partial block 41. Then the bus controller 5 stores the received protocol frame data in the memory block 40. The bus controller 5 then reads, from the memory block 38 of the management block 22, the address which points to the request data block 39 and stores the received request there. Furthermore, the bus controller 5 stores the actual data length in the memory block 38.

As already explained in connection with the sending of requests, in many cases no response is necessary and in other cases only an acknowledgement of receipt is necessary. However, when a response is necessary, the bus controller 5 proceeds as follows:

As can be noted from FIG. 2, two queues are present for each service access point 20-1 to 20-n. Received requests are linked into the one queue and responses to questions to be received are made ready in the other queue. The division of requests and responses into two separate queues makes the updating of the response queue easier. In principle, the management of requests and responses would be possible, however, also in one queue. Such an easier updating of the response queue is obtained, for instance, when the response queue consists only of a single management block aside from the queue head, which block, however, is not linked back to the queue head but points to itself. When the bus controller 5 namely attempts to unlink this management block from the queue by the ordinary method, this attempted unlinking does not actually effect the unlinking of the management block. The management block is therefore always sent again. This type of management block is particularly advantageous if, for instance, a measurement result is to be sent back, since in such case a measurement value need be stored only once in a data block.

After the storing of the received request in the data block 39, the bus controller 5 therefore first of all reads out of the memory location 21' the address which points to the first management block 22' of the response-send queue. The bus controller 5 then reads the address of the response data block 37 and the corresponding data length from the memory block 36. The bus controller 5 then reads the response itself and sends it back over the network bus 1. The management blocks 22 and 22' are then unlinked from the queues and linked as a last element into the execution queue for received inquiries.

The linking is effected into either the high-priority or the low-priority execution queue for received requests, depending upon whether the request is of high or low priority. The priority of a request can be noted, for instance, from the function code FC. However, it is also possible to send the priority of the data sent as a separate parameter in a message.

As a rule, a large number of applications run in each of the electronic devices 2, 2'. With respect to communication between the electronic devices 2, 2' therefore, each electronic device distinguishes between the applications which it itself executes and the applications which are executed by other devices. The applications which a device executes itself are internal applications with respect to such a device while the others are external applications.

In order that the communications do not interfere with each other or otherwise negatively affect each other, a separate resource or memory management is effected with respect to each communication relationship. The bus controller 5 therefore manages not only one service access point but a large number of them. Each service access point is, as a rule, associated with the communication of precisely one internal application with precisely one external application.

The number of possible service access points is limited on the basis of the design of the bus controller 5 and the definition of the bus protocol. If, now, too many internal applications want to communicate with too many external applications, it can therefore happen that the number of service access points which can be made available is not sufficient for this. In such a case, a part of the communications might not take place if the communications can take place exclusively over "private dual relations", and therefore an assigned access point. The service access points can therefore be parameterized so that they are addressable not only from one but also from several source service access points. As a result, any desired large number of application relations can be managed, to be sure with surrender of the "private nature of the application relations".

Communications between different applications takes place over the above-described communication service access points. In order to be able to carry out additional communications which are necessary on the basis of the management of the network bus 1 by the bus controllers 5, the bus controllers 5 provide, in addition to the communication service access points, a relatively small number (at most 5 in the PROFIBUS expansion ISP) of so-called service management service access points. Via these service access points, the bus controller 5 makes available one request-receipt queue and one response-send queue each. The queues serve for the handling of network bus management tasks.

In certain cases it may be advisable or necessary to protocol the entire data exchange centrally over the network bus 1. For this purpose, the monitor queue defined by the partial segment 19 is set up. The monitor queue is only established when the bus controller 5 is instructed accordingly by the processor 3.

In the event of such an instruction, every message, regardless of sender and receiver, is received by the correspondingly instructed bus controller 5 and stored in the monitor queue. The monitor queue consists of a fixed number of management blocks which are organized as a ring-shaped single-linked list. In the queue head which is formed by the partial segment 19, there are stored a reading pointer and a writing pointer, which point to the queue elements which are next to be read or written, respectively. The monitor queue is therefore operated as a circulating buffer.

In contradistinction to the queue elements of the other queues, no further pointing to the data takes place in the case of the management blocks of the monitor queue, but the data are stored directly in the corresponding management block.

Instead of a corresponding preliminary instructing of the bus controller 5, the starting of the protocolling of the data traffic can also be triggered by certain events. One example of such an event is a given telegram which is sent to the bus controller 5.

Finally, the bus controller 5 also manages an identification queue. The identification queue consists of the queue head, which is formed by the partial segment 19', and of a single queue element. A network-bus-related bus control identification message is stored in this queue element. The report comprises, for instance, the type of controller, the address of the controller, and the like. The identification message is sent, for instance, when the bus controller 5 has been coupled again to the network bus 1. After the sending of the identification message, the queue element, however, is not removed from the identification queue.

Finally, it is also noted that the present invention which has been described above is, of course, not limited to the embodiment indicated. Thus, the queues, for instance, need not be divided into high-priority and low-priority queues. Furthermore, it is possible to combine the execution queues for sent and received requests. The division into execution queues for properly and improperly sent requests is also not necessary. Furthermore, a different construction of the management blocks 22 is also possible according to an embodiment of the present invention.

What is claimed is:

1. A bus controller for an electronic device of a plurality of electronic devices, wherein said electronic device includes a processor and a memory having a plurality of individually addressable memory locations, which processor and memory are connected to each other by a system bus, wherein the bus controller is connectable with the memory and with a network bus, wherein the network bus networks said plurality of electric devices with each other, wherein the bus controller:
manages at least one request-receipt queue having queue elements for requests to be received via the network bus, and wherein the queue is organized as a double-linked list;
manages an execution queue for received requests, the execution queue being organized as a double-linked list and wherein after the reception of a request, a first element of the request-receipt queue is unlinked from the request-receipt queue and is linked as a last element into the execution queue;
manages at least one request-send queue with queue elements for a request to be sent, the request-send queue being organized as a double-linked list; and
manages at least one execution queue for sent requests, the execution queue being organized as a double-linked list, and wherein upon the sending of a request, a first element of the request-send queue is sent, and wherein the element is unlinked from the request queue after the sending and is linked as a final element in the execution queue.

2. A bus controller according to claim 1, wherein the bus controller manages separate execution queues for sent and received requests.

3. A bus controller according to claim 1, wherein one of several priority stages is associated with the requests to be sent, and wherein the bus controller manages a separate request-send queue for each priority stage.

4. A bus controller according to claim 3, wherein the bus controller manages a separate execution queue for each priority stage.

5. A bus controller according to claim 1, wherein the bus controller manages separate execution queues for properly sent requests and for improperly sent requests.

6. A bus controller according to claim 1, wherein the bus controller manages a monitor queue for monitoring the network bus.

7. A bus controller according to claim 1, wherein the bus controller manages an identification queue having a single queue element, and wherein a network bus related bus controller identification message is stored in the queue element.

8. A bus controller according to claim 1, wherein at least one internal application can be executed by the electronic device, wherein the internal application communicates via the network bus with an external application which can be executed by another of said electronic devices which is also connectable to the network bus, and wherein, for communication between the internal application and external application, the bus controller provides at least one communication service access point with at least one queue for requests to be received.

9. A bus controller according to claim 8, wherein a plurality of internal applications can be executed by the electronic, device, wherein the internal application communicates via the network bus with at least one external application which can be executed by another of said plurality of electronic devices other than said electronic device which can also be connected to the network bus, and wherein the bus controller provides a communication service access point of its own for the communication of at least one of the plurality of internal applications with the external application.

10. A bus controller according to claim 9, wherein the bus controller makes available in each case a communication service access point of its own for the communication of each internal application with the external application.

11. A bus controller according to claim 8, wherein the bus controller provides at least one service management service access point with at least one queue for requests to be received for network-bus management tasks.

12. A bus controller according to claim 9, wherein the bus controller provides at least one service management service access point with at least one queue for requests to be received for network-bus management tasks.

13. A bus controller according to claim 8, wherein for each service access point, the bus controller manages a receipt queue for requests to be received and a response queue for responses to be sent to received requests.

14. A bus controller according to claim 9, wherein for each service access point, the bus controller manages a receipt queue for requests to be received and a response queue for responses to be sent to received requests.

15. A bus controller according to claim 1, wherein the processor manages requests and responses in accordance with a higher-order protocol, wherein the bus controller manages at least one request-send queue for requests to be sent and at least one request-receipt queue for requests to be received, and an execution queue for requests sent and/or received, wherein each of the queues is organized as a double-linked list and includes a queue head and management blocks as queue entries, and wherein management-block-specific queue management data, user-specific memory management data, and management data of the higher-order protocol are stored in the management blocks.

16. A bus controller according to claim 8, wherein the processor manages requests and responses in accordance with a higher-order protocol, wherein the bus controller manages at least one request-send queue for requests to be sent and at least one request-receipt queue for requests to be received, and an execution queue for requests sent and/or received, wherein each of the queues is organized as a double-linked list and includes a queue head and management blocks as queue entries, and wherein management-block-specific queue management data, user-specific memory management data, and management data of the higher-order protocol are stored in the management blocks.

17. A bus controller according to claim 9, wherein the processor manages requests and responses in accordance with a higher-order protocol, wherein the bus controller manages at least one request-send queue for requests to be sent and at least one request-receipt queue for requests to be received, and an execution queue for requests sent and/or received, wherein each of the queues is organized as a double-linked list and includes a queue head and management blocks as queue entries, and wherein management-block-specific queue management data, user-specific memory management data, and management data of the higher-order protocol are stored in the management blocks.

18. A bus controller according to claim 15, wherein the user data outside the management blocks are stored in at least one data block, and wherein the user-data-specific memory management data comprise at least start addresses and lengths of the at least one data block.

19. A bus controller according to claim 15, wherein the bus controller sends requests in accordance with a predetermined bus protocol over the network bus, and wherein request-specific protocol limit data are stored in the management blocks.

20. A bus controller according to claim 18, wherein the bus controller sends requests in accordance with a predetermined bus protocol over the network bus, and wherein request-specific protocol limit data are stored in the management blocks.

21. A bus controller according to claim 15, wherein the bus controller receives requests in accordance with a predetermined bus protocol over the network bus, and wherein comparison data for comparison with received request-specific protocol limit data are stored in a queue head of the request-receipt queue.

22. A bus controller according to claim 18, wherein the bus controller receives requests in accordance with a predetermined bus protocol over the network bus, and wherein comparison data for comparison with received request-specific protocol limit data are stored in a queue head of the request-receipt queue.

23. A bus controller according to claim 1, wherein the processor, the memory, and the bus controller are connected with each other via the system bus, and wherein the bus controller is connectable with the network bus.

24. An electronic device comprising:

a processor;

a memory having a plurality of individually addressable memory locations;

a bus controller; and a system bus connecting the memory, the processor and the bus controller, the system bus being connectable with a network bus connecting the electronic device with at least one other electronic device;

wherein the bus controller:
  manages at least one request-receipt queue having queue elements for requests to be received via the network bus, and wherein the queue is organized as a double-linked list;
  manages an execution queue for received requests, the execution queue being organized as a double-linked list, and wherein after the reception of a request, a first element of the request-receipt queue is unlinked from the request-receipt queue and is linked as a last element into the execution queue;

manages at least one request-send queue with queue elements for a request to be sent, the request-send queue being organized as a double-linked list; and manages at least one execution queue for sent requests, the execution queue being organized as a double-linked list, wherein upon the sending of a request, a first element of the request-send queue is sent, and wherein the element is unlinked from the request queue after the sending and is linked as a final element in the execution queue.

25. An electronic device according to claim 24, wherein the bus controller manages separate execution queues for sent and received requests.

26. An electronic device according to claim 24, wherein one of several priority stages is associated with the requests to be sent, and wherein the bus controller manages a separate request-send queue for each priority stage.

27. An electronic device according to claim 24, wherein the bus controller manages a separate execution queue for each priority stage.

28. An electronic device according to claim 24, wherein the bus controller manages separate execution queues for properly sent requests and for improperly sent requests.

29. An electronic device according to claim 24, wherein the bus controller manages a monitor queue for monitoring the network bus.

30. An electronic device according to claim 24, wherein the bus controller manages an identification queue having a single queue element, and wherein a network bus related bus controller identification message is stored in the queue element.

31. An electronic device according to claim 24, wherein at least one internal application can be executed by the electronic device, wherein the internal application communicates via the network bus with an external application which can be executed by another of said electronic devices which is also connectable to the network bus, and wherein, for communication between the internal application and external application, the bus controller provides at least one communication service access point with at least one queue for requests to be received.

32. An electronic device according to claim 31, wherein a plurality of internal applications can be executed by the electronic device, wherein the internal application communicates via the network bus with at least one external application which can be executed by another of said plurality of electronic devices other than said electronic device which can also be connected to the network bus, and wherein the bus controller provides a communication service access point of its own for the communication of at least one of the plurality of internal applications with the external application.

33. An electronic device according to claim 32, wherein the bus controller makes available in each case a communication service access point of its own for the communication of each internal application with the external application.

34. An electronic device according to claim 31, wherein the bus controller provides at least one service management service access point with at least one queue for requests to be received for network-bus management tasks.

35. An electronic device according to claim 31, wherein for each service access point, the bus controller manages a receipt queue for requests to be received and a response queue for responses to be sent to received requests.

36. An electronic device according to claim 24, wherein the processor manages requests and responses in accordance with a higher-order protocol, wherein the bus controller manages at least one request-send queue for requests to be sent and at least one request queue for requests to be received, and an execution queue for requests sent and/or received, wherein each of the queues includes a queue head and management blocks as queue entries, and wherein management-block-specific queue management data, uses-specific memory management data, and management data of the higher-order protocol are stored in the management blocks.

37. An electronic device according to claim 36, wherein the user data outside the management blocks are stored in at least one data block, and wherein the user-data-specific memory management data comprise at least start addresses and lengths of the at least one data block.

38. An electronic device according to claim 36, wherein the bus controller sends requests in accordance with a predetermined bus protocol over the network bus, and wherein request-specific protocol limit data are stored in the management blocks.

39. An electronic device according to claim 36, wherein the bus controller receives requests in accordance with a predetermined bus protocol over the network bus, and wherein comparison data for comparison with received request-specific protocol limit data are stored in a queue head of the request-receipt queue.

* * * * *